United States Patent [19]
Anderson et al.

[11] Patent Number: 5,469,409
[45] Date of Patent: Nov. 21, 1995

[54] METHOD FOR CLOCK CALIBRATION IN A POSITION DETERMINATION SYSTEM

[75] Inventors: Neal R. Anderson, Mesa; Bart J. Erickson, Scottsdale; Keith Leung, Chandler, all of Ariz.

[73] Assignee: Motorola, Inc., Schaumburg, Ill.

[21] Appl. No.: 212,480

[22] Filed: Mar. 14, 1994

[51] Int. Cl.⁶ .......................... G04B 47/00; G04F 5/00; G01S 3/02
[52] U.S. Cl. .......................... 368/10; 368/156; 342/450; 342/463
[58] Field of Search .......................... 368/10, 155, 156, 368/200–202; 349/825.49; 342/42, 44, 450, 453, 457, 460

[56] References Cited

U.S. PATENT DOCUMENTS

| | | | |
|---|---|---|---|
| 3,801,981 | 4/1974 | Alpers et al. | 343/7.5 |
| 4,740,792 | 4/1988 | Sagey et al. | 342/457 |
| 4,818,998 | 4/1989 | Apsell et al. | 342/51 |
| 4,864,313 | 9/1989 | Konneker | 342/457 |
| 4,975,707 | 12/1990 | Smith | 342/357 |
| 5,051,741 | 9/1991 | Wesby | 340/825 |

OTHER PUBLICATIONS

"A Novel Procedure For Assessing The Accuracy Of Hyperbolic Multilateration Systems", by Harry B. Lee, MIT Lincoln Laboratory, Lexington, Mass. 02173, from IEEE Transactions On Aerospace And Electronic Systems, vol. AES–11, No. 1 Jan. 1975.

"Accuracy Limitations Of Hyperbolic Multilateration Systems", by Harry B. Lee, MIT Lincoln Laboratory, Lexington, Mass. 02173 from IEEE Transactions Aerospace and Electronic Systems vol. AES–11, No. 1 Jan. 1975.

"Statistical Theory of Passive Locations Systems", by Don J. Torrieri, U.S. Army Countermeasures/Counter–Countermeasures Center from IEEE Transactions On Aerospace And Electronic Systems vol. AES–20, No. 2, Mar. 1984.

"Implementation of GEOSTAR® RDSS Spread Spectrum Receiver", by Masoud Motamedi & Robert D. Briskman, Geostar Corporation, from IEEE/IEICE Global Telecommunications Conference 1987, Conference Record vol. 3 of 3.

Primary Examiner—Vit W. Miska
Attorney, Agent, or Firm—Frank J. Bogacz

[57] ABSTRACT

Timing signals are transmitted from reference transmitters through antenna/receivers (antenna preamplifier nodes) to collector nodes (C-Nodes) and to a central computer. The times of arrival of the signals at the various C-Nodes are measured by the C-Nodes, relative to each C-Node's clock. The time of arrival signals at each C-Node must be based upon a common time reference to be useful for positioning. Therefore, the central computer determines the offsets of clocks relative to a selected reference C-Node clock. The time of arrival signals are then calibrated against one another and used to adjust the time of arrival signals so that all time-of-arrivals are relative to the same reference and can be used for position determination and the clocks of the collection nodes are effectively synchronized.

18 Claims, 3 Drawing Sheets

METHOD FOR CLOCK CALIBRATION IN A POSITION DETERMINATION SYSTEM

BACKGROUND OF THE INVENTION

The present invention pertains to transmission of timing information and more particularly to a method of clock calibration.

Time-of-arrival (TOA) based positioning systems determine the location of a transmitter by measuring and processing the TOA of the transmitted signal at multiple locations around the transmitter. For the TOAs to be useful for position determination, they must all be based on the same time reference.

Existing multilateration systems rely on a means of synchronizing all the clocks in the system to a common time reference. This requires a means of simultaneously resetting all timers in the system to a common time.

If the timers are in close proximity and conditions permit, the timers may be reset by wire. But when the timers are distributed over a wide area, or where existing structures make it difficult to route wires to each timer, the synchronization signal must be sent via a radio link. The use of a radio link requires all timers to have an associated radio receiver to receive the synchronization signal, adding extra cost to each timer node. Another problem with the use of radio links to transmit the synchronization signal is susceptibility to multipath signal propagation delays. Yet another problem with a radio synchronization method in a complex indoor/outdoor environment is that multiple transmitters may be required to reach all timers in the system resulting in additional complexity and cost. It may be difficult to ensure that all transmitters transmit simultaneously.

DESCRIPTION OF THE PREFERRED EMBODIMENT

The invention provides a method of calibrating a set of clocks used to measure signal time-of-arrival (TOA) so that the clocks do not need to be synchronized.

This invention simplifies the clock hardware that measures TOA. Inter-C-Node calibration only requires the use of additional transmitters that are identical to inmate transmitters. The complexity of the calibration is done in software where the non-development cost is minimum.

The disclosed calibration method allows the use of relatively inexpensive clocks that do not have to be continuously synchronized during the operation of the system. Instead of being synchronized, the clock offsets are estimated by a central computer that uses the offsets to calibrate subsequently measured TOAs. Measurement of the TOAs from reference transmitters with known locations allows the central computer to determine the relative clock offsets.

Figure 1:
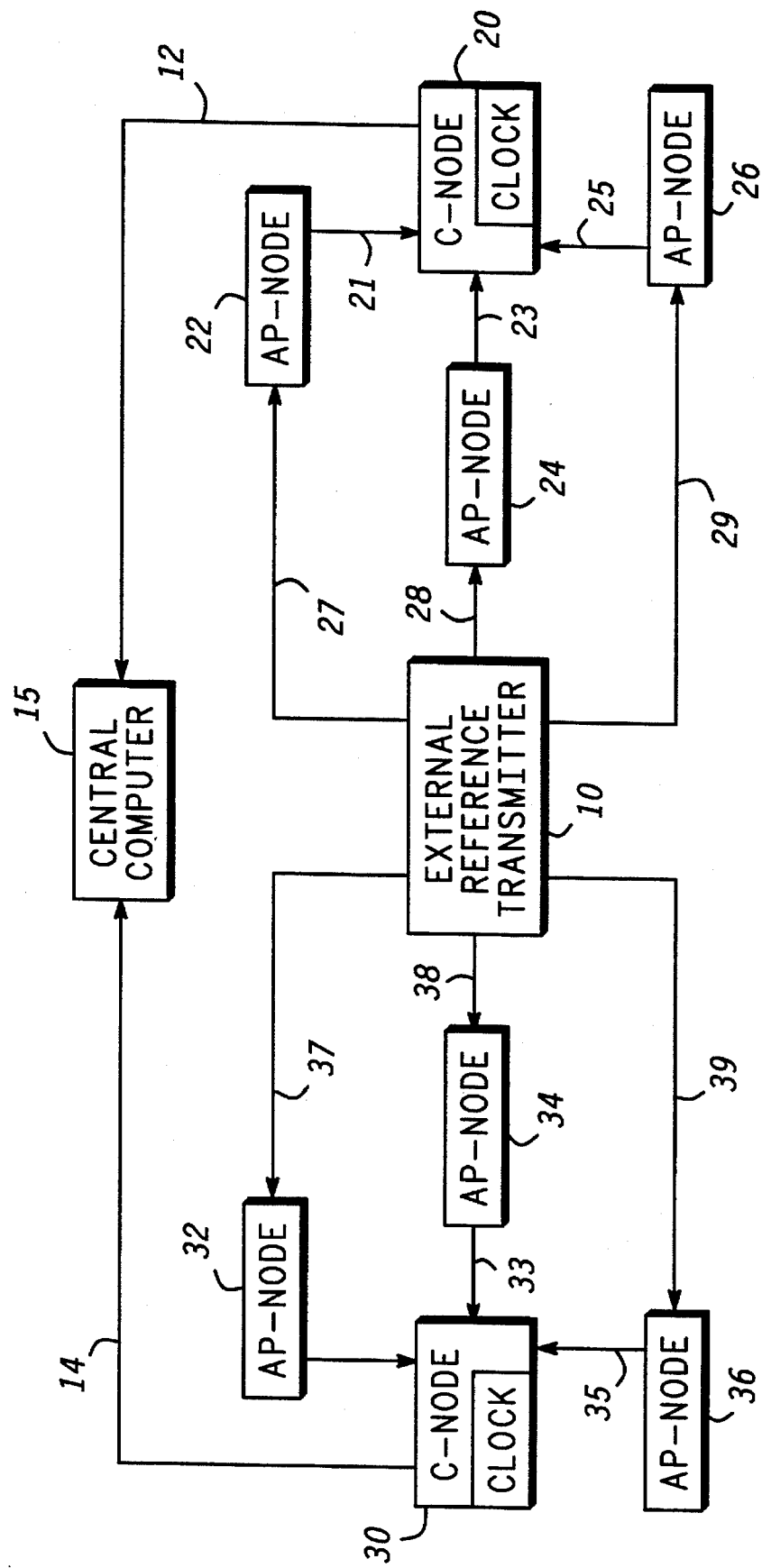
FIG. 1 is a block diagram of a clock calibration arrangement in accordance with the present invention.

FIG. 1 shows a block diagram of a calibration arrangement for a TOA positioning system in accordance with a preferred embodiment of the invention. One external reference transmitter 10 or more couple to multiple AP-Nodes (Antenna Preamplifier Nodes) (22, 24, 26, 32, 34, 36). Each AP-Node (22, 24, 26, 32, 34, 36) couples to one C-Node (Collector Node) (20, 30). Each C-Node (20 30) couples to the Central Computer 15. Each external reference transmitter 10 couples to AP-Nodes (22, 24, 26, 32, 34, 36) of which at least two couple to unique C-Nodes (20 30).

The external reference transmitters 10 transmit a coded spread spectrum radio signal identical to that transmitted by a personal detector unit except for a unique identification code indicating it is an external reference transmitter 10 unit.

Each AP-Node (22, 24, 26, 32, 34, 36) has an antenna that collects the signal and circuitry that converts the signal to a lower frequency for transmission to the C-Node (20, 30).

Each C-Node (20, 30) measures the TOA of each signal collected by the AP-Nodes (22, 24, 26, 32, 34, 36) to which it couples. Each C-Node (20 30) sends the measured TOAs to the Central Computer 15.

The Central Computer 15 uses the measures external reference transmitter 10 signal TOAs, the locations of each AP-Node (22, 24, 26, 32, 34, 36) and external reference transmitter 10 location to compute calibrations for the clock in each C-Node (20, 30).

The coupling (27, 28, 29, 37, 38,9) between the external reference transmitter 10 and the AP-Nodes (22, 24, 26, 32, 34, 36) is via the air at radio frequency. The coupling (21 23 25 31 33 35) between each AP-Nodes (22, 24, 26, 32, 34, 36) and C-Nodes (20 30) is via a low-loss cables capable of carrying radio frequency signals. The coupling (12 14) between each C-Node (20 30) and the central computer (15) is via cable and uses an ethernet protocol.

Motorola part numbers 01-P36936H; 01-P36923H; and 01-P36931 correspond to external reference transmitter 10; AP-nodes (22, 24, 26, 32, 34, 36); and C-nodes (20,30) respectively.

Figure 2:
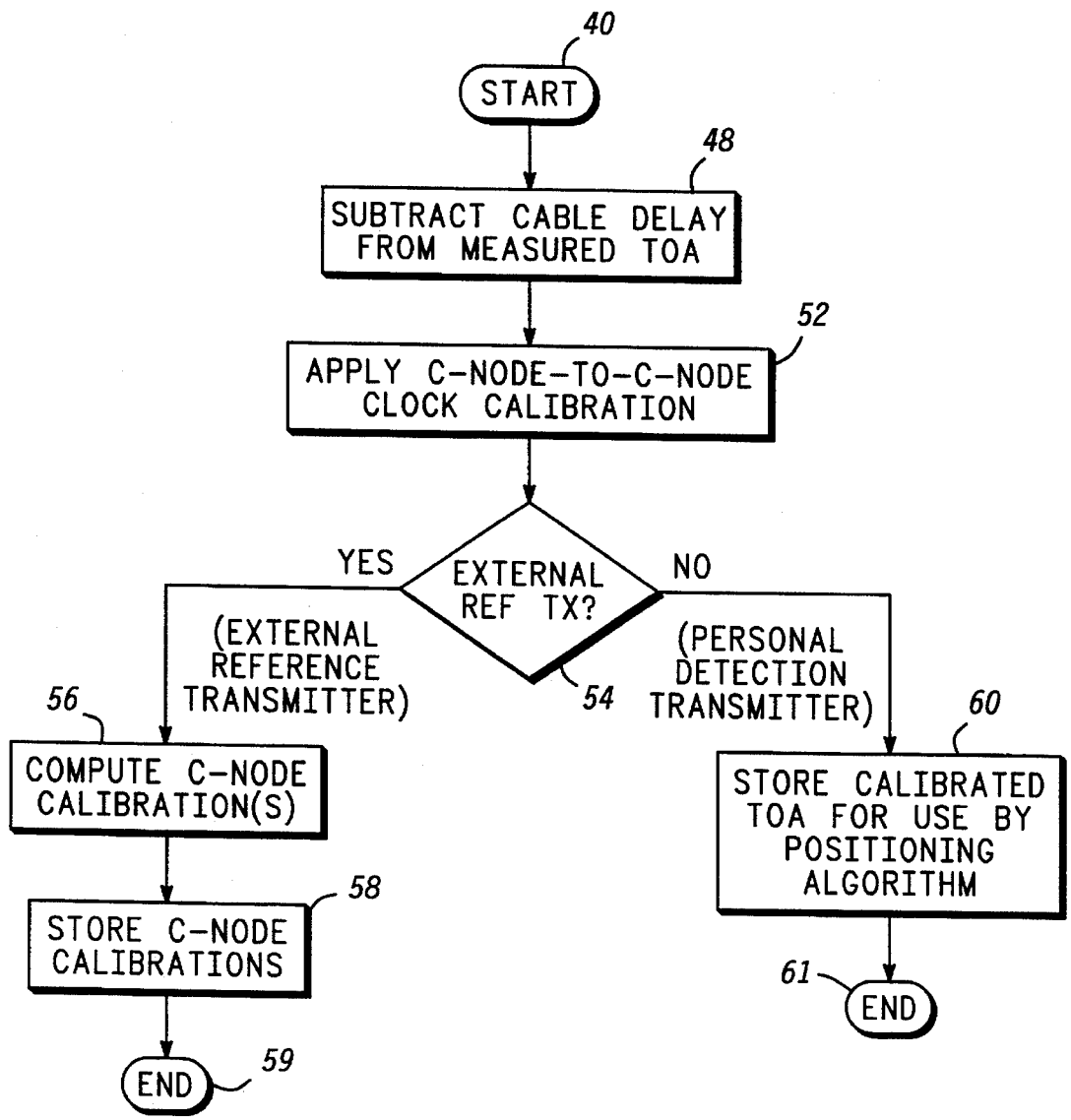
FIG. 2 is a flow chart of a method processing personal detection transmitter and external reference transmitter time-of-arrivals in accordance with the present invention.

FIG. 2 is a top level flow chart of the TOA processing for personal detection unit transmitters (not shown) and external reference transmitters 10 in accordance with the preferred embodiment of the invention. After the start 40 of the processing, the cable delay subtraction process executes for each received time of arrival signal. The input to the cable delay subtraction process block 48 is the time the external reference transmitter 10 or personal detection unit transmitter transmitted in the time reference of the receiving C-Node (20, 30) plus the external reference transmitter 10 or personal detection unit transmitter to AP-Node (22, 24, 26, 32, 34, 36) propagation delay plus the AP-Node (22, 24, 26, 32, 34, 36) to C-Node (20, 30) cable delay. The cable delay subtraction process block 48 subtracts the AP-Node (22, 24, 26, 32, 34, 36) to C-Node (20, 30) cable delay from the input TOA yielding the time the external reference transmitter 10 or personal detection unit transmitter transmitted in the time reference of the receiving C-Node (20, 30) plus the external reference transmitter 10 to AP-Node (22, 24, 26, 32, 34, 36) propagation delay.

Figure 3:
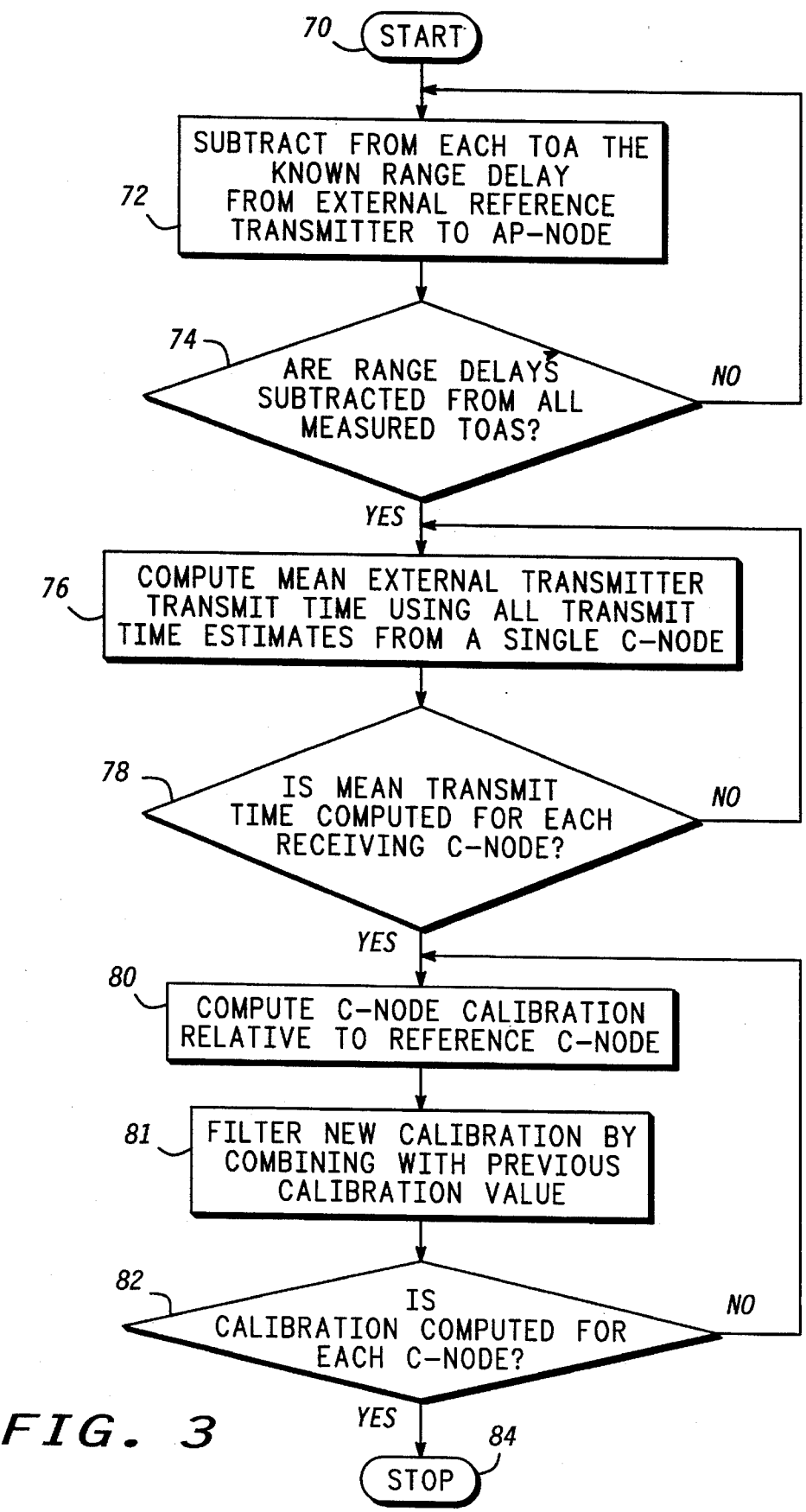
FIG. 3 is a flow chart of a method for clock calibration in accordance with the present invention.

After the cable delay subtraction process block 48 finishes, any existing calibration, as computed by the calibration computation process block 56 and shown in detail in FIG. 3, is applied block 52 to the TOA. Process block 52 of applying the calibration to the TOA simply involves adding a positive or negative number of clock counts (i.e., the calibration for the C-Node) to the TOA, resulting in the TOA being made relative to the reference C-Node clock. (The reference C-Node is arbitrarily chosen by the system designer prior starting system operation as any one of the C-Nodes (20, 30) in the system.) The output of the calibration application process block 52 is, therefore, the time the external reference transmitter 10 or personal detection unit transmitter transmitted in the time reference of the reference C-Node (20, 30) plus the external reference transmitter 10 or personal detection unit transmitter to AP-Node (22, 24, 26, 32, 34, 36) propagation delay.

After the calibration application process block 52 is finished, the transmitter type is examined, block 54. If the TOA is from a personal detection unit transmission, it is stored for use by the positioning algorithm, block 60 and the method is ended by block 61. If the TOA is from an external reference transmitter 10, C-Node calibrations are determined by block 56 computing, and stored by block 58 for future use. The method is ended by block 59. The details of the C-Node calibration computation process block 56 are shown in FIG. 3.

FIG. 3 is a flowchart of the calibration computation process block 56 shown in FIG. 2 in accordance with the preferred embodiment of the invention. The process blocks flowchart is executed once for each transmission of the external reference transmitter 10. The inputs to the calibration computation process block 56 are estimates of the times the external reference transmitter 10 transmitted plus external reference transmitter 10 to AP-Node (22, 24, 26, 32, 34, 36) propagation delays. These inputs will be in the time reference of the receiving C-Node (20, 30) while the calibration process is initializing, but once the calibration process has reached steady state, the inputs will be in the time reference of the reference C-Node.

After the start block 70 of the processing, the range propagation delay subtraction process block 72 executes. The range propagation delay subtraction process block 72 subtracts the known range propagation delays between the external reference transmitter 10 and the receiving AP-Node (22, 24, 26, 32, 34, 36) from each of the received TOAs is determined, block 74. This results in multiple estimates of the external reference transmitter 10 transmit time in the time reference of the measuring C-Node (20, 30) clock.

The multiple estimates of the external reference transmitter 10 transmit time are provided to a two-pass mean estimator block 76 that estimates the reference transmitter 10 transmit time in the time reference of each measuring C-Node (20, 30) clock. Each mean is computed by block 76 using only times collected by a single C-Node (20, 30). A two-pass mean estimator block 76 is used to estimate the mean to minimize the effect of data with large errors (due to multipath signal propagation and/or system noise) on the mean estimate. The mean estimator block 76 uses all the data in the first pass to compute a mean and a variance. The mean and variance are used to exclude some of the data for the second pass. Specifically, only data within the first pass mean, plus or minus an appropriate constant multiplied by the standard deviation, is used in the second pass. A second pass mean is computed using only this remaining data. The output of the two-pass mean estimator block 76 is an estimate of the reference transmitter 10 transmit time in the time reference of the measuring C-Node (20, 30) clock. The mean transmit time is computed for each C-Node (20, 30), block 78. Estimates of the reference transmitter 10 transmit time in the time reference of each of the measuring C-Node (20, 30) clocks are provided to the process block 80 that calculates the calibration for each C-Node (20, 30). One C-Node is selected to begin.

The new calibration for each C-Node clock (20,30) is further filtered by combining it with the previous calibration value using an alpha filter 81. The alpha filter 81 smoothes out variations in the calibrations computed from one external reference transmitter 10 transmission to the next. The alpha filter 81 implements the following function which requires memory to store the old calibration.

New_Calibration=Alpha*New_Calibration+(1−Alpha)*Old_Calibration

Alpha is a constant between zero and one. Values of Alpha near zero heavily smooth the New Calibration, whereas values of Alpha near one allow the New Calibration to vary rapidly. The value of Alpha chosen depends on the predictability of the propagation paths of the external reference transmitter 10 signal. Values of Alpha near zero are needed when the calibration computations vary substantially among all the external reference transmitter 10 transmissions.

The calibrations are computed block 80 for each C-Node clock, block 82, as the difference between the external transmitter transmit time estimate based on that C-Nodes data and the estimate based on the reference C-Node's data. The reference C-Node is arbitrarily chosen to be any one of the C-Nodes. By definition, the calibration for the reference C-Node clock is zero. When all C-Node calibrations have been computed block 84, they are stored block 58. The calibrations are applied block 52 (FIG. 2) to future measured TOAs.

The method shown above provides a method for measuring signal time of arrival so that free running clocks do not require synchronization. This method greatly simplifies the hardware required to measure time of arrival signals. Only an extra reference transmitter is required which keeps the cost for calibration to a minimum.

Although the preferred embodiment of the invention has been illustrated, and that form described in detail, it will be readily apparent to those skilled in the art that various modifications may be made therein without departing from the spirit of the invention or from the scope of the appended claims.

What is claimed is:

1. A method for clock calibration in a position determination system comprising the steps of:

receiving by a central computer time of arrival signals from each of a plurality of C-Nodes having an internal clock;

applying a C-Node to C-Node clock calibration by the central computer for each received time of arrival signal for each of the C-Nodes;

determining a new C-Node to C-Node clock calibration by the central computer for each of the C-Nodes; and storing the new C-Node to C-Node clock calibration by the central computer for applying to subsequently received time of arrival signals.

2. The method for clock calibration as claimed in claim 1, wherein said step of determining a new C-Node to C-Node clock calibration includes the step of subtracting from each time of arrival signal a range delay, the range delay corresponding to a transmission time from an external reference transmitter to an antenna preamplifier node.

3. The method for clock calibration as claimed in claim 2, wherein the step of determining a new C-Node to C-Node clock calibration further includes the steps of:

determining whether the range delay has been subtracted from each time of arrival signal; and iterating the step of subtracting from each time of arrival signal, if the range delay has not been subtracted from each time of arrival signal.

4. The method for clock calibration as claimed in claim 3, wherein the step of determining a new C-Node to C-Node clock calibration further includes the step of determining a mean time for transmissions from a plurality of antenna preamplifier nodes to a particular C-Node, if all range delays have been subtracted from the time of arrival signals.

5. The method for clock calibration as claimed in claim 4, wherein the step of determining a new C-Node to C-Node clock calibration further includes the steps of:

determining whether a mean transmit time has been computed for each C-Node; and iterating the step of determining a mean transmit time for a particular C-Node, if a mean transmit time has not been determined for each C-Node.

6. The method for clock calibration as claimed in claim 5, wherein the step of determining a new C-Node to C-Node clock calibration further includes the steps of:

selecting a particular C-Node as a reference C-Node; and determining for another C-Node the calibration relative to the reference C-Node.

7. The method for clock calibration as claimed in claim 6, wherein the step of determining a new C-Node to C-Node clock calibration further includes the steps of:

determining whether a clock calibration has been computed for each C-Node; and iterating the steps of selecting and determining for another C-Node the clock calibration, if a calibration has not been determined for each C-Node.

8. The method for clock calibration as claimed in claim 1, wherein there is further included the step of subtracting a cable delay from each time of arrival signal, the cable delay corresponding to a transmission time from a particular AP-Node to a particular C-Node.

9. The method for clock calibration as claimed in claim 1, wherein there is further included the steps of:

determining whether the time of arrival signal originated from an external reference transmitter; and if the time of arrival signal is from a reference transmitter performing the steps of:

determining a new C-Node to C-Node clock calibration; and storing the new C-Node to C-Node clock calibration.

10. The method for clock calibration as claimed in claim 9, wherein there is further included the step of storing a calibrated time of arrival signal for subsequent position determination, if the time of arrival signal is not from an external reference transmitter.

11. A method for clock calibration in a position determination system, the method comprising the steps of:

receiving by a central computer a time of arrival signal from each of the plurality of C-Nodes having an internal clock;

subtracting a cable delay from each time of arrival signal, the cable delay corresponding to a transmission time from each AP-Node to each C-Node;

applying a C-Node to C-Node clock calibration by the central computer for each received time of arrival signal for each of the C-Nodes;

determining whether each time of arrival signal is from an external reference transmitter:

if the time of arrival signal originated from the external reference transmitter;

determining a new C-Node to C-Node clock calibration by the central computer for each of the C-Nodes; and storing the new C-Node to C-Node clock calibration by the central computer for applying to subsequently received time of arrival signals.

12. The method for clock calibration as claimed in claim 11, wherein said step of determining a new C-Node to C-Node clock calibration includes the step of subtracting from each time of arrival signal a range delay, the range delay corresponding to a transmission time from the external reference transmitter to an antenna preamplifier node.

13. The method for clock calibration as claimed in claim 12, wherein the step of determining a new C-Node to C-Node clock calibration further includes the steps of:

determining whether the range delay has been subtracted from each time of arrival signal; and iterating the step of subtracting from each time of arrival signal, if the range delay has not been subtracted from each time of arrival signal.

14. The method for clock calibration as claimed in claim 13, wherein the step of determining a new C-Node to C-Node clock calibration further includes the step of determining a mean time for transmissions from a plurality of antenna preamplifier nodes to a particular C-Node, if all range delays have been subtracted from the time of arrival signals.

15. The method for clock calibration as claimed in claim 14, wherein the step of determining a new C-Node to C-Node clock calibration further includes the steps of:

determining whether a mean transmit time has been computed for each C-Node; and iterating the step of determining a mean transmit time for a particular C-Node, if a mean transmit time has not been determined for each C-Node.

16. The method for clock calibration as claimed in claim 15, wherein the step of determining a new C-Node to C-Node clock calibration further includes the steps of:

selecting a particular C-Node as a reference C-Node; and determining for another C-Node the calibration relative to the reference C-Node.

17. The method for clock calibration as claimed in claim 16, wherein the step of determining a new C-Node to C-Node clock calibration further includes the steps of:

determining whether a clock calibration has been computed for each C-Node; and iterating the steps of selecting and determining for another C-Node the clock calibration, if a calibration has not been determined for each C-Node.

18. The method for clock calibration as claimed in claim 11, wherein there is further included the step of storing a calibrated time of arrival signal for subsequent position determination, if the time of arrival signal is not from an external reference transmitter.

* * * * *